(12) United States Patent
Huang

(10) Patent No.: US 7,822,329 B2
(45) Date of Patent: Oct. 26, 2010

(54) CAMERA AND IMAGE STABILIZATION THEREOF

(75) Inventor: Yu-Cheng Huang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 937 days.

(21) Appl. No.: 11/701,494

(22) Filed: Feb. 2, 2007

(65) Prior Publication Data
US 2008/0101782 A1    May 1, 2008

(30) Foreign Application Priority Data
Oct. 27, 2006    (TW) .............................. 95139797 A

(51) Int. Cl.
*G03B 17/00* (2006.01)
(52) U.S. Cl. .................................. 396/55; 348/208.99
(58) Field of Classification Search ............. 396/52–55; 348/208.99, 208.4, 208.7, 208.15
See application file for complete search history.

(56) References Cited
U.S. PATENT DOCUMENTS

| | | | | |
|---|---|---|---|---|
| 5,307,113 A | * | 4/1994 | Egawa | .......................... 396/54 |
| 6,343,187 B1 | * | 1/2002 | Sato | ............................ 396/52 |
| 7,212,230 B2 | * | 5/2007 | Stavely | .................... 348/208.1 |
| 7,271,830 B2 | * | 9/2007 | Robins et al. | ............ 348/208.6 |

FOREIGN PATENT DOCUMENTS

JP    11044902 A    *    2/1999

* cited by examiner

*Primary Examiner*—Christopher Mahoney
(74) *Attorney, Agent, or Firm*—Rosenberg, Klein & Lee

(57) ABSTRACT

An image stabilization method for a camera is provided. The image stabilization method controls the shutter of the camera. The image stabilization method, according to the present invention, first detects whether a trigger signal has been inputted, wherein the trigger signal is inputted by a user and starts an image capturing process. Next, the time when the trigger signal was inputted is detected and recorded as a first time. Afterwards, a stabilization time is delayed based upon the first time. Finally, a drive signal is generated when the stabilization time ends, wherein the drive signal drives the shutter to turn on for executing the image capturing process.

8 Claims, 4 Drawing Sheets

CAMERA AND IMAGE STABILIZATION THEREOF

BACKGROUND OF THE INVENTION

1. Field of the Invention

The present invention is related to a camera and an image stabilization method and system thereof, and more particular to a camera and an image stabilization method and system that suppresses the effects of a user's hands shaking by driving the camera's shutter to turn on with delay.

2. Description of Related Art

Often a person wishing to take a photograph will suffer from shaking hands. A vibration stabilization camera is presented to the public for preventing such a problem. There are various image stabilization mechanisms already available on the market, such as a movable lens system for vibration compensation, diaphragm control and open period control of a shutter, and image signal processing for optimizing the clearness of an image.

Generally speaking, an image stabilization camera includes a vibration sensing circuit, and compensation hardware or software compensates for any shaking that is sensed based on the output of the vibration sensing circuit. The image stabilization cameras disclosed above go someway to overcoming the problem of poor definition of an image caused by shaking.

However, the cost of the image stabilization mechanism including the vibration sensing circuit, the optical compensation system and the image processing system is high. Moreover, the image stabilization mechanism increases the complexity of the camera so that both quality and the yield rate are affected.

The inventor offers the present invention for overcoming the foregoing problems of a complicated mechanical structure and its associated high cost. Because camera vibration is usually caused by hand shake when the photographer presses the release button, the present invention suppresses the hand shake by driving the shutter to turn on with delay following the pressing of the release button. Furthermore, the degree of hand shake differs from photographer to photographer. Therefore, the present invention provides an anti-shake mechanism for recording the degree of hand shake for different photographers so that the image stabilization system can perform accurately with low cost.

SUMMARY OF THE INVENTION

Accordingly, the scope of the present invention is to provide a camera and an image stabilization method and system that reduces the cost of image stabilization by driving the shutter to turn on with delay.

The present invention provides an image stabilization method for a camera which controls the shutter of the camera. The image stabilization method, according to the present invention, firstly detects whether a trigger signal has been inputted. Next, the time when the trigger signal is detected is recorded as a first time. Next, a stabilization time is delayed based upon the first time. Last, a drive signal was generated when the stabilization time ends, wherein the drive signal drives the shutter to turn on for executing the image capturing process.

In an embodiment of the present invention, the stabilization time is set by the execution of an anti-shake program by a user. The process for setting the stabilization time by the user includes the following steps: first, the anti-shake program of the camera is executed. Next, a user interface was generated with the execution of the anti-shake program, wherein the user interface is capable of guiding the user to capture an image via the camera. Next, a plurality of images are captured by the user via the camera in accordance with the guidance of the user interface, wherein each of the images corresponds to a delay time of turning on the shutter. Next, a specific image of the plurality of images is chosen by comparing the quality of the images. Last, the delay time corresponding to the specific image is set as the stabilization time.

The present invention further provides an image stabilization system for a camera in which the image stabilization system controls the shutter of the camera. The image stabilization system includes a stabilization time setting module, a controlling module, and a controlling module. The stabilization time setting module therein stores a stabilization time of hand shake. The controlling module is coupled to the stabilization time setting module. The controlling module receives a trigger signal, records the time when the trigger signal was generated as a first time, delays for the stabilization time based upon the first time, and generates a shutter drive signal when the stabilization time ends. The shutter driving module is coupled to the controlling module. The shutter driving module receives the shutter drive signal so as to drive the shutter to turn on.

The present invention further provides a camera in which the camera includes a shutter, an inputting module, and an image stabilization system. The inputting module receives a control from a user for generating a trigger signal. The image stabilization system includes a stabilization time setting module, a controlling module, and a shutter driving module. The stabilization time setting module therein stores a stabilization time. The controlling module is coupled to the inputting module and stabilization time setting module. The controlling module receives the trigger signal, records the time when the trigger signal was generated as a first time, delays for the stabilization time based upon the first time, and generates a shutter drive signal when the stabilization time ends. The shutter driving module is coupled to the controlling module and the shutter. The shutter driving module receives the shutter drive signal so as to drive the shutter to turn on.

The objective of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENTS

Figure 1:
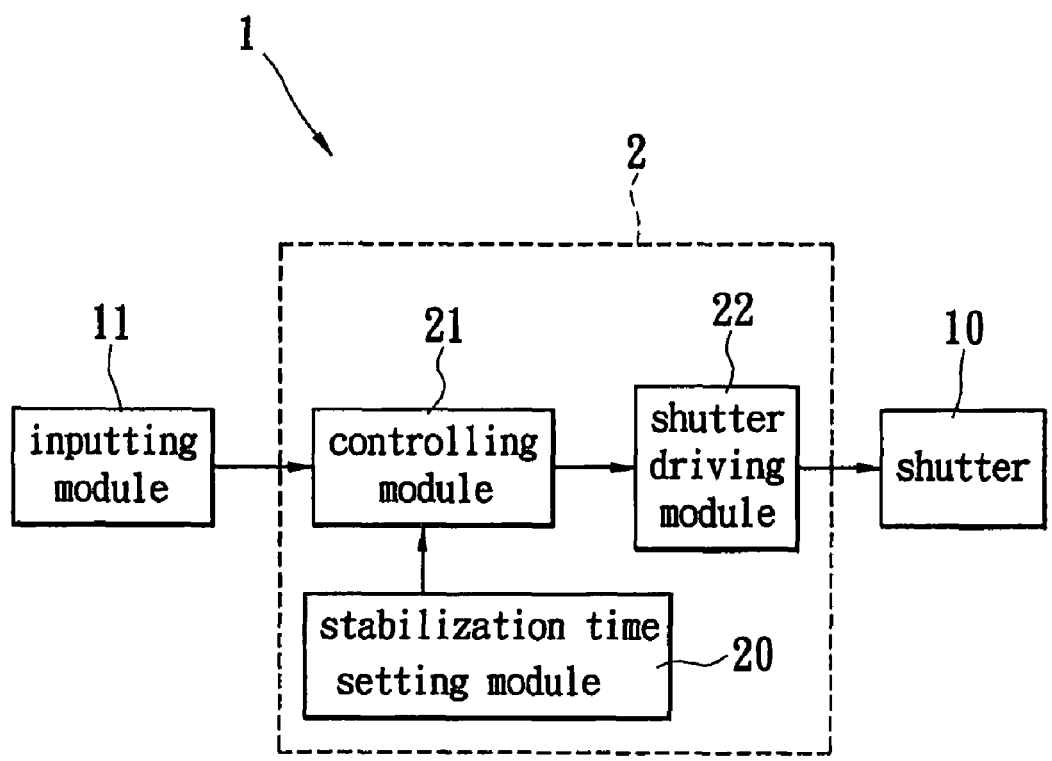
FIG. 1 is a block diagram of the camera and the image stabilization system thereof according to the present invention.

Please refer to FIG. 1 that illustrates a block diagram of a camera 1 and an image stabilization system 2 according to the present invention. As shown in FIG. 1, the camera 1 includes a shutter 10, an inputting module 11, and the image stabilization system 2. The image stabilization system 2 includes a stabilization time setting module 20, a controlling module 21, and a shutter driving module 22. The image stabilization system 2 controls the shutter 10 of the camera 1.

Figure 2:
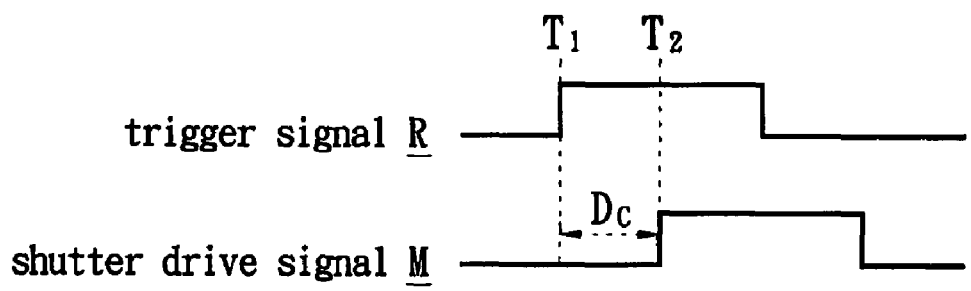
FIG. 2 is a timing diagram of shutter control according to the present invention.

Please also refer to FIG. 2 for further explanation of the mechanism of the image stabilization system 2 shown in FIG. 1. FIG. 2 shows a timing diagram of shutter control according to the present invention, in which the timing diagram shows the timing of a trigger signal R and a shutter drive signal M. The shutter 10 shown in FIGS. 1 and 2 indicates the component that covers the image sensing area, such as a film or the surface of a CCD. The inputting module 11 includes a release button disposed on a shell of the camera 1. The user presses the release button and generates a trigger signal R. Generally speaking, the release button provides a two-segment control. When the first segment of the release button is pressed, the camera performs an auto-focus process. When the second segment of the release button is pressed, the trigger signal R, as shown in FIG. 2, was generated. The trigger signal R triggers the camera 1 to capture an image.

In the image stabilization system 2, the stabilization time setting module 20 therein stores a stabilization time $D_C$, wherein the stabilization time $D_C$ is set up by executing an anti-shake program. Additionally, the stabilization time $D_C$ is usually set to be less than one second. The controlling module 21 is coupled to the inputting module 11 and the stabilization time setting module 20, wherein the controlling module 21 receives the trigger signal R and records the time when the trigger signal R was generated as a first time $T_1$. The controlling module 21 delays for the stabilization time $D_C$ based upon the first time $T_1$, and generates a shutter drive signal M on a second time $T_2$ when the stabilization time $D_C$ ends. The shutter driving module 22 is coupled to the controlling module 21. The shutter driving module 22 receives the shutter drive signal M so as to drive the shutter 10 to turn on and capture an image.

Figure 3:
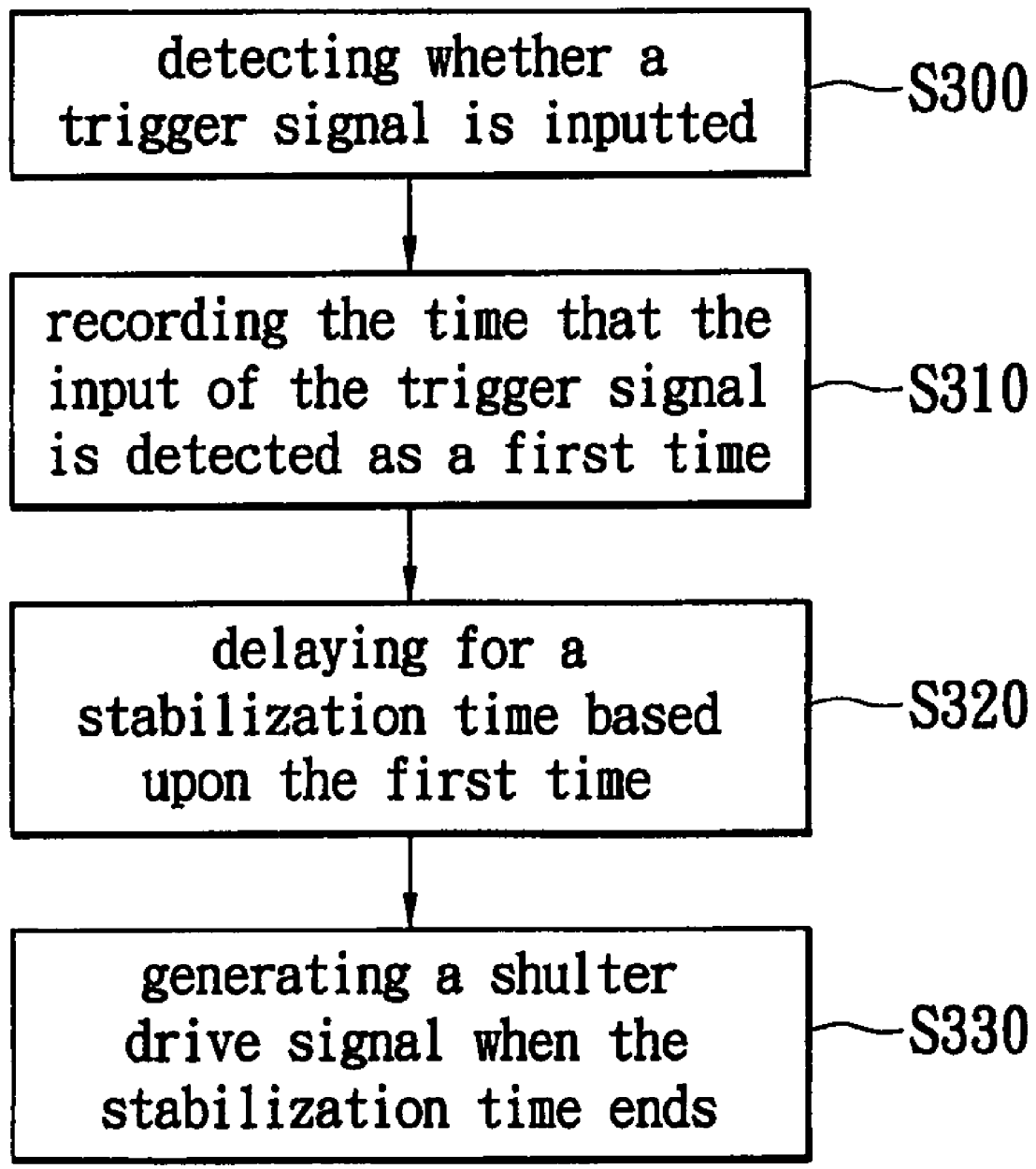
FIG. 3 is a flow chart of the image stabilization method of the camera according to the present invention.

Please refer to FIG. 3 which illustrates the flow chart of the image stabilization method according to the present invention. Please also refer to FIGS. 1 and 2 respectively for a system diagram and a timing diagram. As shown in FIG. 3, the image stabilization method includes the following steps.

Firstly, the S300 detects whether the trigger signal R has been inputted or not, wherein the trigger signal R is inputted when a user presses the release button and triggers the camera 1 to capture an image.

Next, S310 is performed. The time when the trigger signal R is inputted is detected and recorded as a first time $T_1$.

Next, S320 delays for a stabilization time $D_C$ based upon the first time $T_1$.

Lastly, S330 generates a shutter drive signal M when the stabilization time $D_C$ ends, wherein the shutter drive signal M drives the shutter 10 of the camera 1 to turn on and capture an image.

In S320, the stabilization time $D_C$ is set by the execution of the anti-shake program by the user.

Figure 4:
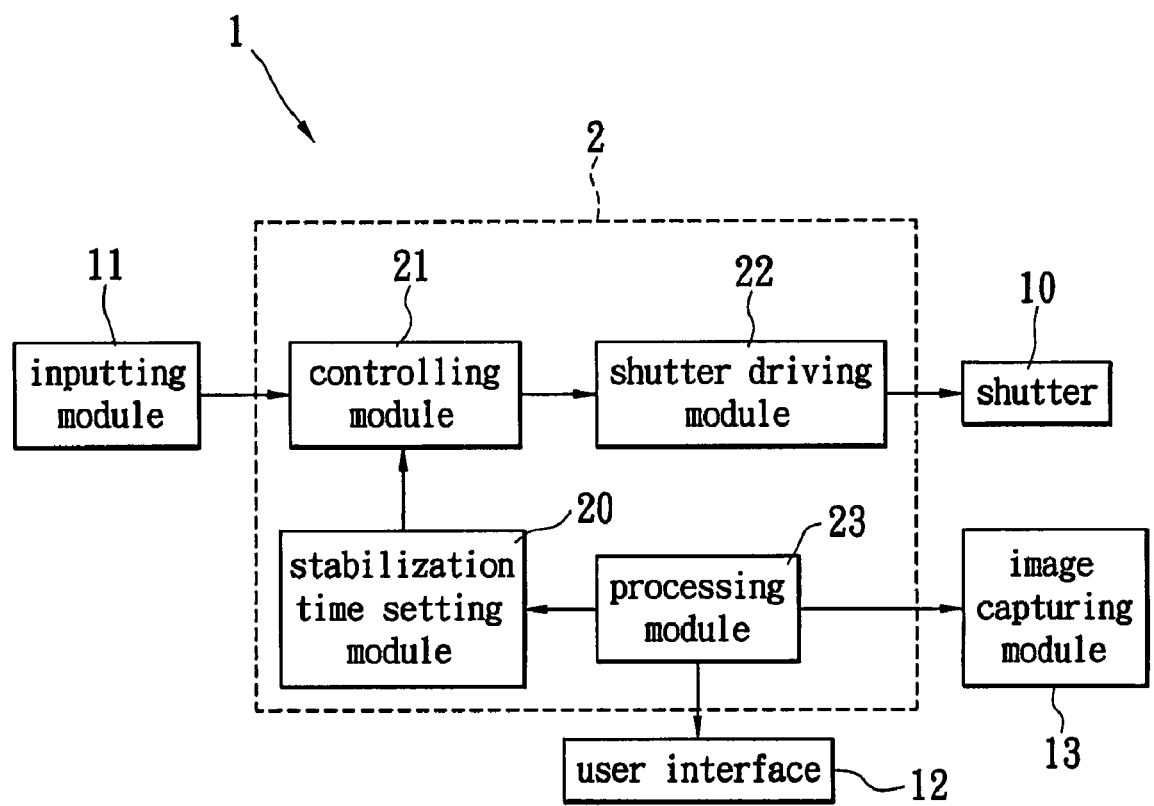
FIG. 4 illustrates a block diagram for an embodiment of the camera and the image stabilization system thereof according to the present invention.

The explanation of the mechanism of the anti-shake program is illustrated in detailed as follows. Please refer to FIG. 4 which illustrates a block diagram for an embodiment of the camera 1 and the image stabilization system 2 thereof according to the present invention. As shown in FIG. 4, the image stabilization system 2 includes a processing module 23. The processing module 23 is coupled to the stabilization time setting module 20, wherein the processing module 23 is capable of executing the anti-shake program. Furthermore, the camera 1 includes a user interface 12 and an image capturing module 13. The user interface 12 is coupled to the processing module 23, wherein the user interface 12 is generated when the user executes the anti-shake program. The user interface 12 guides the user to capture a plurality of images via the camera 1, and each of the images corresponds to a delaying time of turning on the shutter 10. The image capturing module 13 captures the images, and transmits the signal of the images to the processing module 23. The processing module 23 includes a CMOS image sensor (not shown) for capturing the images. The image capturing module 13 is a known art, so the application of the image capturing module 13 will not be mentioned herein.

The function of the delay time of turning on the shutter 10 is the same as the stabilization time $D_C$ shown in FIG. 2. After the delay time following the input of the trigger signal R is detected ends, the controlling module 2 generates the shutter drive signal M to drive the shutter 10 to turn on and capture an image. The anti-shake program captures a plurality of images, wherein each of the images corresponds to a different delay time of turning on the shutter 10. Next, the anti-shake program chooses a specific image from the images by comparing the quality of the images. Next, the stabilization time $D_C$ is set as the delay time corresponding to the specific image and the stabilization time $D_C$ is stored in the stabilization time setting module 20.

An additional two methods for choosing the specific image are described below.

First, with the execution of the anti-shake program, the processing module 23 compares the quality of the images, chooses a specific image from the images, and sets the delay time corresponding to the specific image as the stabilization time $D_C$.

Next, with the execution of the anti-shake program, the user follows the guidance of the user interface 12, compares the quality of the images, chooses a specific image from the images, and sets the delay time corresponding to the specific image as stabilization time $D_C$.

Figure 5:
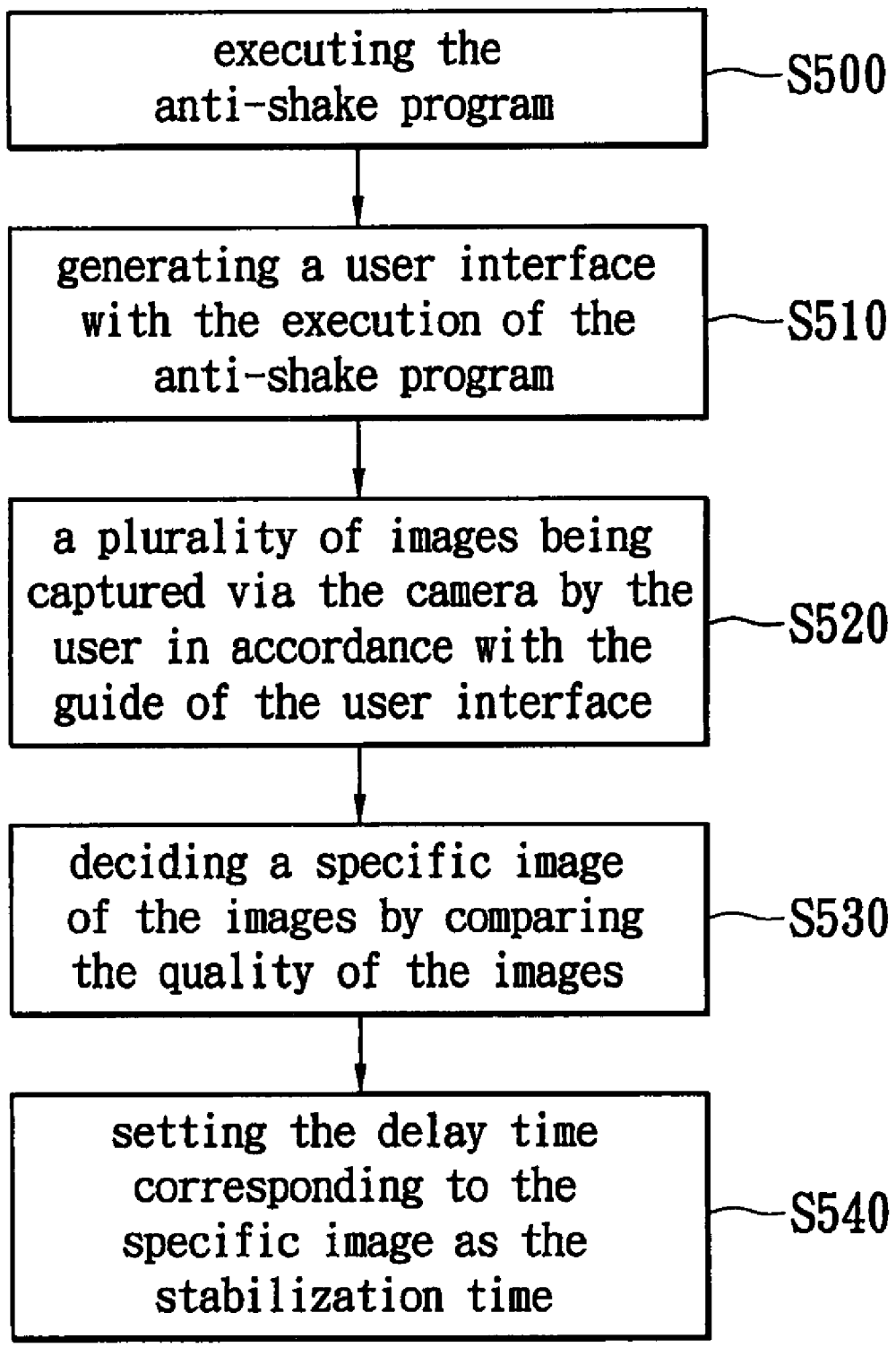
FIG. 5 is a flow chart showing the process for setting the stabilization time according to the present invention.

Please refer to FIG. 5 which illustrates a flow chart showing the process for setting the stabilization time according to the present invention. As shown in FIG. 5, the process for setting the stabilization time includes the following steps as described below.

First, S500 is performed. The camera 1 executes the anti-shake process.

Next, S510 is performed. With the execution of the anti-shake process, the camera 1 generates a user interface 12, wherein the user interface guides the user to capture images via the camera 1.

Next, S520 is performed. According to the guidance of the user interface 12, the user captures a plurality of images, wherein each of the images corresponds to a different delay time of turning on the shutter 10.

Next, S530 compares the quality of the images and chooses a specific image from the images.

Lastly, S540 sets the delay time corresponding to the specific image as stabilization time $D_C$.

In S530, the quality of the specific image is superior to the quality of the other images.

In one embodiment according to the present invention, the quality of the images is compared for choosing a specific image by the user in S530.

In another embodiment according to the present invention, the quality of the images is compared for choosing a specific image with the execution of the anti-shake program by the processing module 23 in S530.

Therefore, through the embodiment illustrated above, one should realize that the camera and the stabilization method and system thereof according to the present invention controls the shutter to turn on with delay for the stabilization time, so that the costs of producing the present invention is lower than image stabilization cameras of the prior art. Furthermore, the camera and the stabilization method and system thereof according to the present invention sets the stabilization time with the execution of the anti-shake program by the user, so that the effects of hand shaking are negated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image stabilization method for controlling a shutter of a camera, the image stabilization method comprising:
   detecting whether a trigger signal has been inputted, wherein the trigger signal is inputted by a user for starting an image capturing process;
   recording when an input of the trigger signal is detected as a first time;
   preparing a stabilization time; and
   generating a drive signal when the stabilization time ends, wherein the drive signal drives the shutter to turn on for executing the image capturing process;
   wherein the stabilization time is set by an execution of an anti-shake program including:
      generating a user interface according to the execution of the anti-shake program, wherein the user interface is capable of guiding the user for image capturing via the camera;
      capturing a plurality of images via the camera by the user in accordance with an guidance of the user interface, wherein each of the images corresponds to a delay time associated with turning on the shutter;
      choosing a specific image from the images according to a quality of each of the images; and
      setting the delay time corresponding to the specific image as the stabilization time.

2. The image stabilization method according to claim 1, wherein the camera comprises a processing module, and the processing module compares the quality of the images so as to choose the specific image via the execution of the anti-shake program in the step of choosing the specific image.

3. The image stabilization method according to claim 1, wherein the stabilization time is less than one second.

4. An image stabilization system for a camera, wherein the image stabilization system controls a shutter of the camera, the image stabilization system comprising:
   a stabilization time setting module for storing a stabilization time;
   a controlling module, coupled to the stabilization time setting module, for receiving a trigger signal, and recording when the trigger signal is generated as a first time, preparing the stabilization time the first time, and generating a shutter drive signal when the stabilization time ends;
   a shutter driving module, coupled to the controlling module, wherein the shutter driving module receives the shutter drive signal so as to drive the shutter to turn on; and
   a processing module;
   wherein the stabilization time is set by an execution of an anti-shake program by the processing module;
   wherein the camera further includes a user interface which is coupled to the processing module for guiding a user to capture a plurality of images via the camera according to the execution of the anti-shake program, in which each of the images corresponds to a delay time associated with turning on the shutter;
   wherein the processing module compares a quality of each of the images according to the execution of the anti-shake program, so as to choose a specific image from the images, set the delay time corresponding to the specific image as the stabilization time, and store the stabilization time in the stabilization time setting module.

5. The image stabilization system according to claim 4, wherein the camera further comprises an inputting module coupled to the controlling module, wherein the inputting module comprises a release button when pressed for generating the trigger signal.

6. The image stabilization system according to claim 4, wherein the stabilization time is less than one second.

7. A camera, comprising:
   a shutter;
   an inputting module, for generating a trigger signal; and
   an image stabilization system, comprising:
      a stabilization time setting module, for storing a stabilization time;
      a controlling module, coupled to the inputting module and the stabilization time setting module, for receiving the trigger signal, recording when the trigger signal is generated as a first time, preparing the stabilization time, and generating a shutter drive signal when the stabilization time ends;
      a shutter driving module, coupled to the controlling module and the shutter, for receiving the shutter drive signal so as to drive the shutter to turn on; and
      a processing module;
   wherein the stabilization time is set by an execution of an anti-shake program by the processing module;
   wherein the camera further includes a user interface coupled to the processing module for guiding the user to capture a plurality of images via the camera, in which each of the images corresponds to a delay time associated with turning on the shutter;
   wherein the processing module compares a quality of each of the images according to the execution of the anti-shake program, so as to choose a specific image from the images, and set the delay time corresponding to the specific image as the stabilization time.

8. The camera according to claim 7, wherein the stabilization time is less than one second.

* * * * *